United States Patent [19]
Seki et al.

[11] Patent Number: 6,061,366
[45] Date of Patent: May 9, 2000

[54] TRANSMITTING DEVICE, RECEIVING DEVICE, PACKET TRANSMISSION SYSTEM AND PACKET SIGNAL TRANSMISSION METHOD

[75] Inventors: Kazuhiko Seki; Hideki Kato, both of Tokyo, Japan

[73] Assignee: Uniden Corporation, Tokyo, Japan

[21] Appl. No.: 08/835,396

[22] Filed: Apr. 7, 1997

[30] Foreign Application Priority Data

Dec. 5, 1996 [JP] Japan ................................. 8-325261

[51] Int. Cl.$^7$ ........................................................ H04J 3/18
[52] U.S. Cl. ................................................................ 370/477
[58] Field of Search .................................... 370/389, 477, 370/465, 470, 471, 521, 472, 394; 371/67.1

[56] References Cited

U.S. PATENT DOCUMENTS 5,293,379  3/1994  Carr ........................................ 370/118
5,561,662  10/1996  Kakuma et al. ........................ 370/118

FOREIGN PATENT DOCUMENTS 61-161847  7/1986  Japan.
5-35624  2/1993  Japan.
6-188912  7/1994  Japan.
6-261074  9/1994  Japan.

*Primary Examiner*—Ajit Patel
*Attorney, Agent, or Firm*—McDermott, Will & Emery

[57] ABSTRACT

The present invention allows efficient data compression when the contents of the control fields of packets are the same. An identity flag is substituted for a control field when the control field of an already-transmitted packet signal is identical to the control field of a packet signal which is to be newly transmitted. When non-identical, a non-identity flag is inserted to the control field. Thus, by using a larger number of small data format when identical control fields are transmitted consecutively, the data length of the control fields can be shortened.

17 Claims, 14 Drawing Sheets

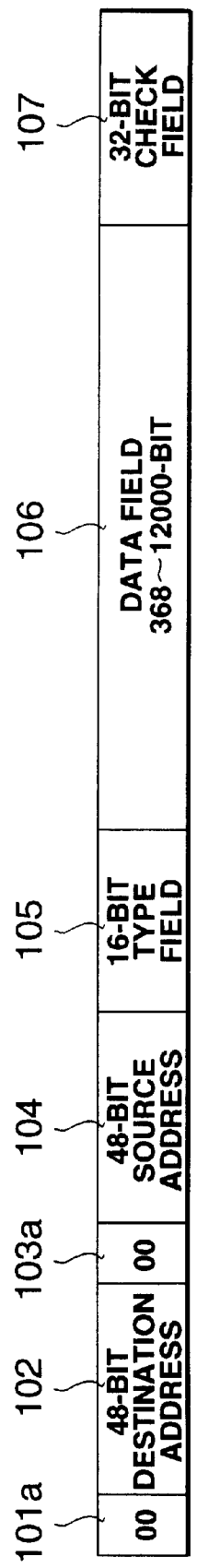
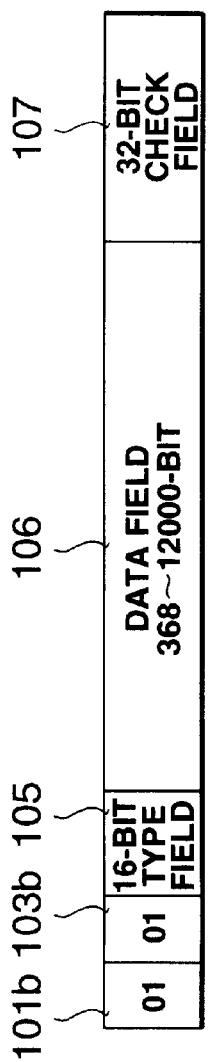
FIG.1A
FIG.1B

FIG.7
**AN EXAMPLE OF AN IDENTITY FLAG
IN THE CASE OF 3-ENTRY CACHE**
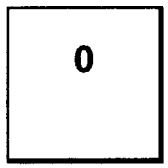 IN THE CASE OF IDENTITY FLAG (1-BIT)
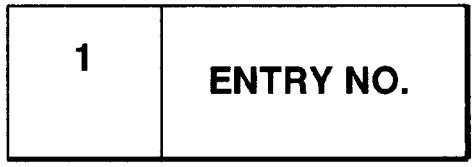 IN THE CASE OF NON-IDENTITY FLAG (3-BITS)

FIG.8A A FRAME WITH TWO FIELDS BEING NON-IDENTICAL

FIG.8B A FRAME OF THE ORIGINAL DATA

FIG.8C A FRAME WITH THE TWO FIELDS BOTH BEING IDENTICAL nn : IDENTICAL ENTRY NO.
mm : IDENTICAL ENTRY NO.

FIG.13
AN EXAMPLE OF AN IDENTITY FLAG
IN THE CASE OF 3-ENTRY CACHE
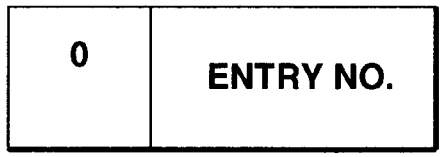 IN THE CASE OF IDENTITY FLAG
(3 BITS)
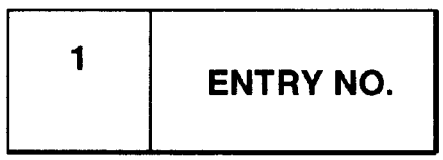 IN THE CASE OF NON-IDENTITY FLAG
(3 BITS)

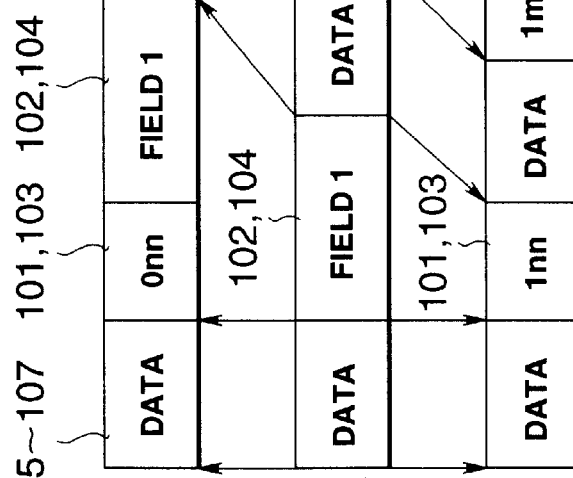
FIG.14A A FRAME WITH TWO FIELDS BEING NON-IDENTICAL
FIG.14B A FRAME OF THE ORIGINAL DATA
FIG.14C A FRAME WITH TWO FIELDS BOTH IDENTICAL
nn : IDENTICAL ENTRY NO.
mm : IDENTICAL ENTRY NO.

TRANSMITTING DEVICE, RECEIVING DEVICE, PACKET TRANSMISSION SYSTEM AND PACKET SIGNAL TRANSMISSION METHOD

BACKGROUND OF THE INVENTION

1. Field of the Invention

The present invention relates to a transmitting device, a receiving device, a packet transmission system and a packet signal transmission method for conducting a packet transmission. More particularly, this invention relates to the above-mentioned devices and methods which enable efficient packet data compression.

2. Description of the Related Art

With the distribution of computers, data communication has become common. A packet transmission method is often used for an efficient data communication. A packet is a data package which is exchanged between devices through a data communication link. A packet generally includes data and headers. A header is, for example, address information which is necessary for a correct transmission of data.

There are following prior arts concerning a packet transmission:

"Transmission of Information Sequence Number in Packet Data Transmission System" described in the official gazette of the Japanese Patent Laid-Open (Kokai) Publication No. SHO 61-161847 is a transmission method for including sequence numbers in a packet information field and for acknowledging the information by returning the number of the received information. By this method, an acknowledgment status is transmitted for n units of information packets which have been received prior to the information packet then received. "Method of Receiving Data Packet of at Least One Packet by Receiving Device" described in the official gazette of the Japanese Patent Laid-Open (Kokai) Publication No. HEI 6-188912 memorizes, upon receiving data packets including a first packet, which may optionally include a direction that a second packet is to be subsequently transmitted, and an optional second data packet, information which indicates the data packet within the memory, and accepts data packet information according to whether or not there is a direction.

"Packet Signal Selecting Device and Movement Switching Center" described in the official gazette of the Japanese Patent Laid-Open (Kokai) Publication No. HEI 6-261074 chooses a single packet by comparing a plurality of packets coming in from a plurality of transmission paths.

"Data Transfer Method and Data Transmitting Device and Restoring Device" described in the official gazette of the Japanese Patent Laid-Open (Kokai) Publication No. HEI 5-35624 is a data transfer method for transmitting data through a plurality of channels by dividing the data into a plurality of packets, and for restoring the data into the original data.

If a Ethernet between a terminal and a hub is replaced with a wireless system, point-to-point packet communication will be conducted, and the packet of the Ethernet will be transferred without any change through a wireless channel. In this case, since only the packets from or to a specific terminal are basically transmitted, the address portions in the control field of the Ethernet are occasionally the same. In other words, an address method of such transmission are inefficient and redundant. The prior arts listed above could not solve the above-described problems.

SUMMARY OF THE INVENTION

The present invention is designed to solve the problems above. The object of the invention is to provide a transmitting device, a receiving device, a packet transmission system and a packet signal transmission method which allow efficient data compression of packet signal.

The transmitting device of the present invention comprises: a first storing circuit which stores a control field of a post-transmission packet signal, a comparing circuit which compares a control field of a pre-transmission packet signal with a control field stored in the first storing circuit; a control field substituting circuit for transmitting the packet signals by substituting the packet signals of at least a part of the control field of the pre-transmission packet signal for identical signal on the basis of the results of the comparison conducted by the comparing circuit.

The receiving device of the present invention comprises: a second storing circuit which stores the control field of an already-received packet signal; and an identical information determining circuit which determines whether or not identical information exists in the newly received packet signals; and a control field substituting circuit which substitutes identical information in the newly received packet signal for the information stored in the second storing circuit, when the identical information determining circuit determines that the identical information exists.

A packet signal transmission method of the present invention comprises: a first read-out step of reading the control field of a post-transmission first packet signal; a second read-out step of reading the control field of the pre-transmission second packet signal; a comparison step of comparing the control fields of the first packet signal and the second packet signal; a substitution step of substituting identical information for the control field of the second packet signal when it is determined at the comparison step that at least a part of the control field is identical; a transmission step of transmitting the second packet; a reception step of receiving the second packet; a determination step of determining whether or not the control field of the second packet is identical information; and a resubstitution step of resubstituting the identical information on the basis of the control field of the already-received first packet signal when the control field of the second packet is identical information.

A packet transmission method of the present invention comprises: a first read-out step of reading the control field of first and the second packet signals after transmission; a second read-out step of reading the control field of a pre-transmission third packet signal; a first comparison step of comparing the control field of the first packet signal with the control field of the third packet signals; a first substitution step of substituting first identical information for the control field of the third packet signal when it is determined at the first comparison step that at least a part of the control field is identical; a second comparison step of comparing the control field of the second packet signal with the control field of the third packet signal; a second substitution step of substituting second identical information for the control field of the third packet signal when it is determined at the second comparison step that at least a part of the control field is identical; a transmission step of transmitting the third packet; a reception step of receiving the third packet; a first determination step of determining whether or not the control field of the third packet is first identical information; a first resubstitution step of resubstituting the first identical information on the basis of the control field of the already-received first packet signal when the control field of the third packet is the first identical information; a second determination step of determining whether or not the control field of the third packet is the second identical information on the basis of the control field of the already-received second packet signal when the control field of the third packet is the second identical information.

BRIEF DESCRIPTION OF THE DRAWINGS

FIG. 1A and FIG. 1B respectively show examples of the packet format of the Ethernet according to the first embodiment of the present invention.

FIG. 7 shows an example of an identity flag in the first embodiment of the present invention.

FIG. 8A shows a frame with two fields being non-identical, FIG. 8B shows a frame of the original data, and FIG. 8C shows a frame with the two fields both being identical.

FIG. 13 shows an example of an identity flag according to the second embodiment of the present invention.

FIG. 14A, 14B and 14C respectively show the following examples according to the second embodiment of the present invention: a frame with two field being identical, a frame of the original data, and a frame with both two fields being identical.

DESCRIPTION OF THE PREFERRED EMBODIMENTS

First Embodiment of the Present Invention

If the Ethernet between, for example, a terminal and a hub is replaced with a wireless Ethernet, point-to-point packet communication will be utilized, and the packet of the Ethernet will be transmitted without any change through a radio channel. In this case, only the packet from or to a specific terminal is basically transferred. Therefore, portion of the control field of the Ethernet, such as address is occasionally the same. In such case, by omitting data with the same content, an efficient compression can be conducted. Principles of operation are explained below.

Principles of Operation

FIG. 1 shows an example of a packet format of Ethernet according to the first embodiment of the present invention. The overall length of format A shown in FIG. 1A is 516–12, 148 bits. The overall length of Format B shown in FIG. 1B is 420–12, 052 bits.

Figure 2:
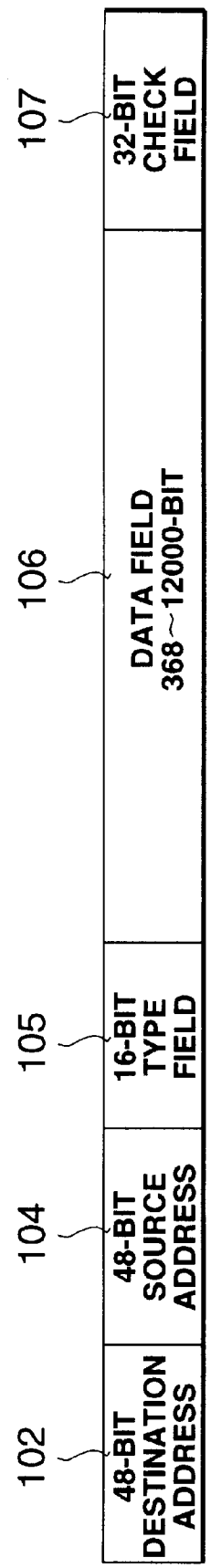
FIG. 2 shows a packet format of the Ethernet (DIX specification).

FIG. 2 shows a packet format of Ethernet (DIX specification). The overall length of Format shown in FIG. 2 is 512–12, 144 bits.

In FIG. 1, reference numeral 101 is 2-bit determining flag which corresponds to a control field 102. Reference numeral 103 is 2-bit determining flag which corresponds to a control field 104. The meaning of such determining flag will be described below in detail.

In FIGS. 1 and 2, reference numeral 102 is a 48-bit destination address which indicates the destination of the packet. Reference numeral 104 is a 48-bit source address which indicates the source of the packet. Reference numeral 105 is a 16-bit type field which indicates the length of a data portion of the frame. Reference numeral 106 is a data field of 368–12, 000 bits. Reference numeral 107 is a 32-bit check field for correcting errors of CRC (Cyclic Redundancy Check).

As shown in FIG. 2, the normal packet format of the Ethernet always comprises the destination address 102 and a source address 104. If not many instruments are connected to the Ethernet, naturally there will not be many kinds of these address fields 102 and 104. Moreover, if transmission is consecutively conducted from a hub to a specific terminal, or from a specific terminal to a hub, address values appearing on the address fields 102 and 104 will be the same. This means that information in the address fields 102 and 104 are redundant.

Therefore, if the same address value is repeatedly found, the address value of the received frame is memorized, and determining flag is added which means that such address values is the same as the one previously received, thereby avoiding the transmission of the same address value. If the determining flag has a smaller number of bits than those of the address value, it is expected that the entire data length of a plurality of communicated frames will be shortened.

Explanations are hereinafter made by giving an example where merely two address fields 102 and 104 are compressed and the respective fields 102 and 104 have respectively three-entry cache memory (hereinafter simply referred to as the "cache"). The cache is a memory which memorizes the address value of the received frames. As illustrated in FIG. 1, 2-bit determining flag 101 and 103 are respectively added to the two address fields 102 and 104. When the determining flag 101 and 103 indicates "00", it means that such address value is new. The determining flag 101 is followed by the destination address 102 and the determining flag 103 is followed by the source address 104. Such example is shown in FIG. 1A.

In the case of "01", "10" or "11", the addresses memorized in the respective entries are used. For example, in the case of "01", the first address memorized in the cache is used; in the case of "10", the second address memorized in the cache is used; and in the case of "11", the third address memorized in the cache is used. In other words, if the determining flag is other than "00", the address fields 102 and 104 are not transferred. Such example is shown in FIG. 1B.

As shown in FIGS. 1 and 2, (frame length in FIG. 1B)<(frame length in FIG. 2)<(frame length in FIG. 1A). If the two address fields are both identical, (48 bits)+(48 bits)−(2×2 bits)=92 bits are compressible. If only one field is identical, (48 bits)−(2 bits)=46 bits are compressible. On the other hand, if both fields are non-identical, the frame is extended by additional 2×2=4 bits.

Assuming that the average user data length of Ethernet is 1,024 bits (packet length: 1168 bits), 92 bits correspond to 7.8%, 46 bits correspond to 3.9% and 4 bits correspond to 0.3%. Therefore, if data communication is performed only between specific terminals, the frame length is shortened, and the data compression can be performed. Although the actual degree of data compression differs depending on the system, quantitative effect of data compression can be predicted by calculating expected values on the basis of respective occurrence rates in the above three cases.

Furthermore, since the user data 106 actually comprises control fields of layer 3 or higher, if protocol-dependent above mentioned compression method is applied also to such portion, greater compression effect than that of the address field compression is obtained.

Although the determining flag 101 and 103 are referred to as 2 bits in the above explanation, they may be 3 bits, 4 bits, etc. Generally speaking, the larger the number of bits, the larger will be the size of the cache. Yet, the address hit rate will become higher, and in most cases, neither the destination address 102 nor the source address 104 will be added like in FIG. 1B. Thus it is expected that the entire data compression efficiency will become higher.

Figure 3:
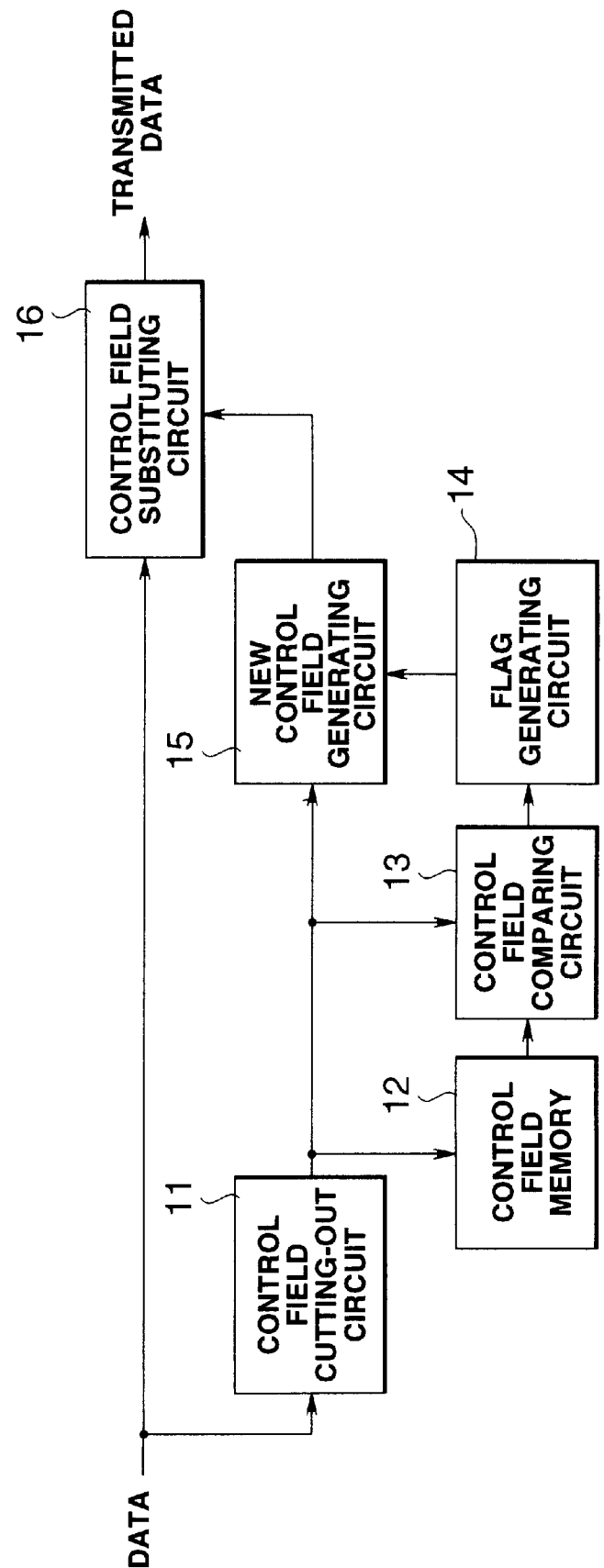
FIG. 3 shows a construction of the transmitting station side of the first embodiment of the present invention.
Figure 4:
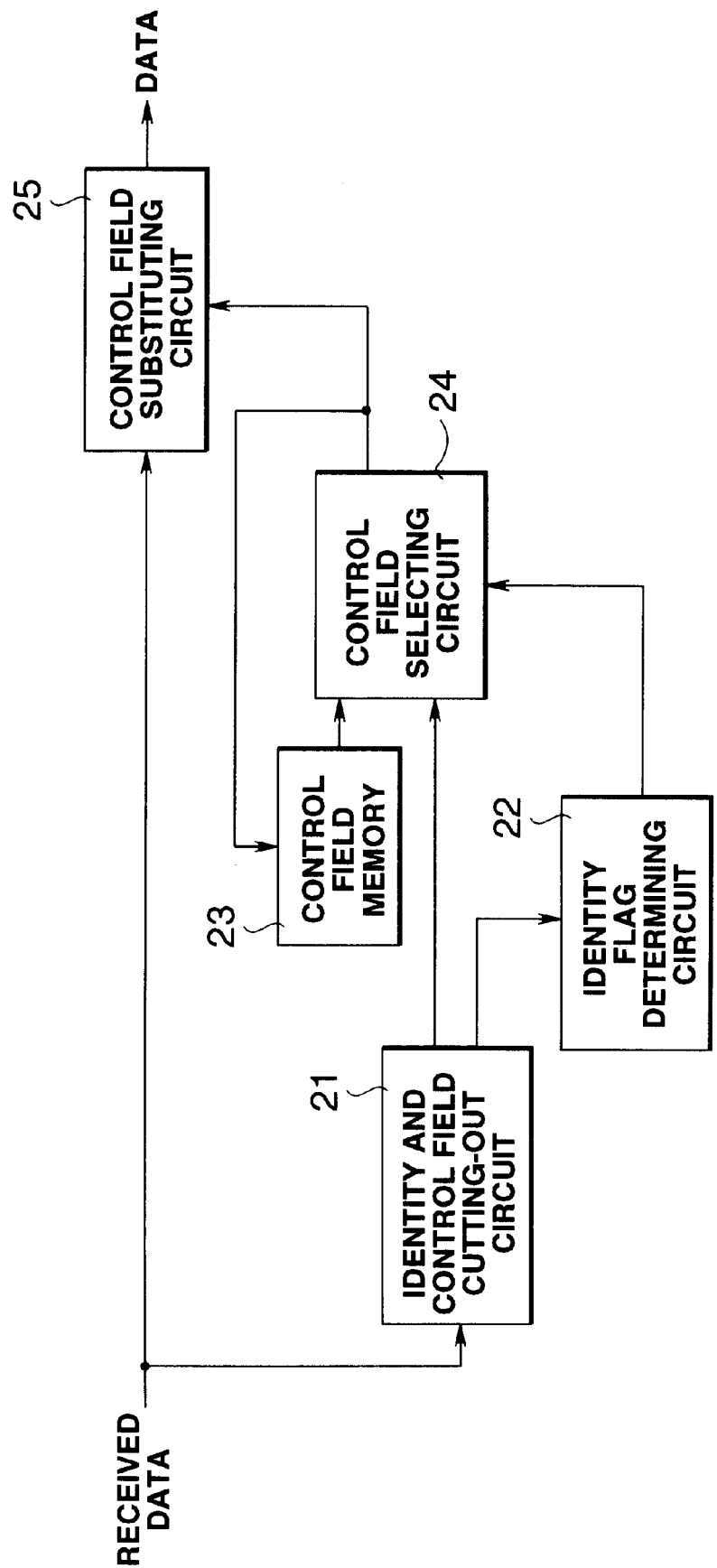
FIG. 4 shows a construction of the receiving station side in the first embodiment of the present invention.

Examples of Construction of Devices at Transmitting Station and Receiving Station FIG. 3 is a block diagram of the transmitting station side, and FIG. 4 is a block diagram of the receiving station side. The transmitting station in FIG. 3 and the receiving station in FIG. 4 constitute a pair. A control field is compared with the immediately preceding frame and any data with the same content as that of the previous frame are omitted, thereby allowing efficient data compression.

In FIG. 3, a control field cutting-out circuit 11 is a circuit which cuts out a certain control field from a frame. The control field cutting-out circuit 11 cuts out, from a fixed-length or variable-length data with determined data format a certain field with, for example, a fixed data length. The position and the length of the field is determined for each frame format. For example, the destination address 102 and the source address 104 are cut out from the format shown in FIG. 2.

A control field memory 12 memorizes the content of the field which has been cut out by a control field cutting-out circuit 11. Every time each frame is sent, the control field memory 12 memorizes the control field portion of such frame.

A control field comparing circuit 13 compares the control field cut out by the control field cutting-out circuit 11 with the control field of the previous frame memorized in the control field memory 12. As a result of comparison, the control field comparing circuit 13 outputs whether or not the control field of the transmitted frame is identical or non-identical to the control field of the immediately preceding frame.

A flag generating circuit 14 is a circuit which generates an identity flag (determining flag) on the basis of the comparison result at the control field comparing circuit 13. If identical, an identity flag is outputted, and if non-identical, a non-identity flag is outputted. An identity flag requires at least 1 bit. In the case of a one-entry cache, comparison is made only with the immediately preceding transmission and, therefore, 1-bit identical/non-identical information will be obtained. An example of an identity flag is shown in FIG. 7.

A new control field generating circuit 15 generates a new field on the basis of the output of the control field cutting-out circuit 11 and the output of the flag generating circuit 14. If the flag generating circuit 14 outputs an identity flag, the new control field generating circuit 15 outputs only such identity flag. On the other hand, if the flag generating circuit 14 outputs a non-identity flag, the new control field generating circuit 15 outputs the non-identity flag connected with the original field.

Figure 8:
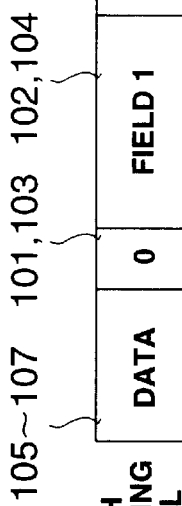
FIGS. 8A, 8B and 8C show examples according to the first embodiment of the present invention.

A control field substituting circuit 16 substitutes a new field generated by the new control field generating circuit 15 for a certain field of the frame cut out by the control field cutting-out circuit 11. If identical, the new field will be only the identity flag. If not identical, the new field will be a non-identity flag and the original field. For example, if identical, the control fields of the original data shown in FIG. 8B are substituted, as illustrated in FIG. 8C. That is, since the two fields are both identical, the destination address field and the source address field are deleted from the original frame. On the other hand, if they are not identical, the control fields of the original data of FIG. 8B are substituted as illustrated in FIG. 8A. That is, since the two fields are both not identical, a non-identity flag is inserted before the destination address field and the source address field.

The frame transmitted from the transmitting station shown in FIG. 3 is inputted to the receiving station shown in FIG. 4.

As shown in FIG. 4, an identity and control field cutting-out circuit 21 is a circuit which cuts out from the received data an identity flag and a control field portion which are located in specific positions. For example, the portions of reference numerals 101 and 103 and the portions of reference numerals 102 and 104 as shown in FIG. 8A, or the portions of reference numerals 101 and 103 in FIG. 8C are cut out. Among the portions being cut out, the identity flag portion is sent to an identity flag determining circuit 22. If the identity flag is identical, no control field will be cut out. Even if any control field is cut out, data of such control field portion will have no meaning.

A control field memory 23 memorizes the content of control fields of the received frame. For each frame, it memorizes the field which is outputted by a control field selecting circuit 24.

A control field selecting circuit 24 selects a control field on the basis of the output from the identity flag determining circuit 22, and outputs the selected control field to a control field substituting circuit 25. If the identity flag is indicated, it means that the control field of the frame then received is identical to that of the frame received the previous time. Therefore, the control field selecting circuit 24 selects the field which is memorized in the control field memory 23. On the other hand, if the non-identify flag is indicated, the control field selecting circuit 24 selects the field outputted by the identity and control field cutting-out circuit 21.

A control field substituting circuit 25 substitutes a control field outputted from the control field selecting circuit 24 for a specific portion of the data.

By the processing described above, even if the received frame is either FIGS. 8A or 8C, the output of the control field substituting circuit 25 will be as shown in FIG. 8B and the resultant frame will revert to the original state.

Figure 5:
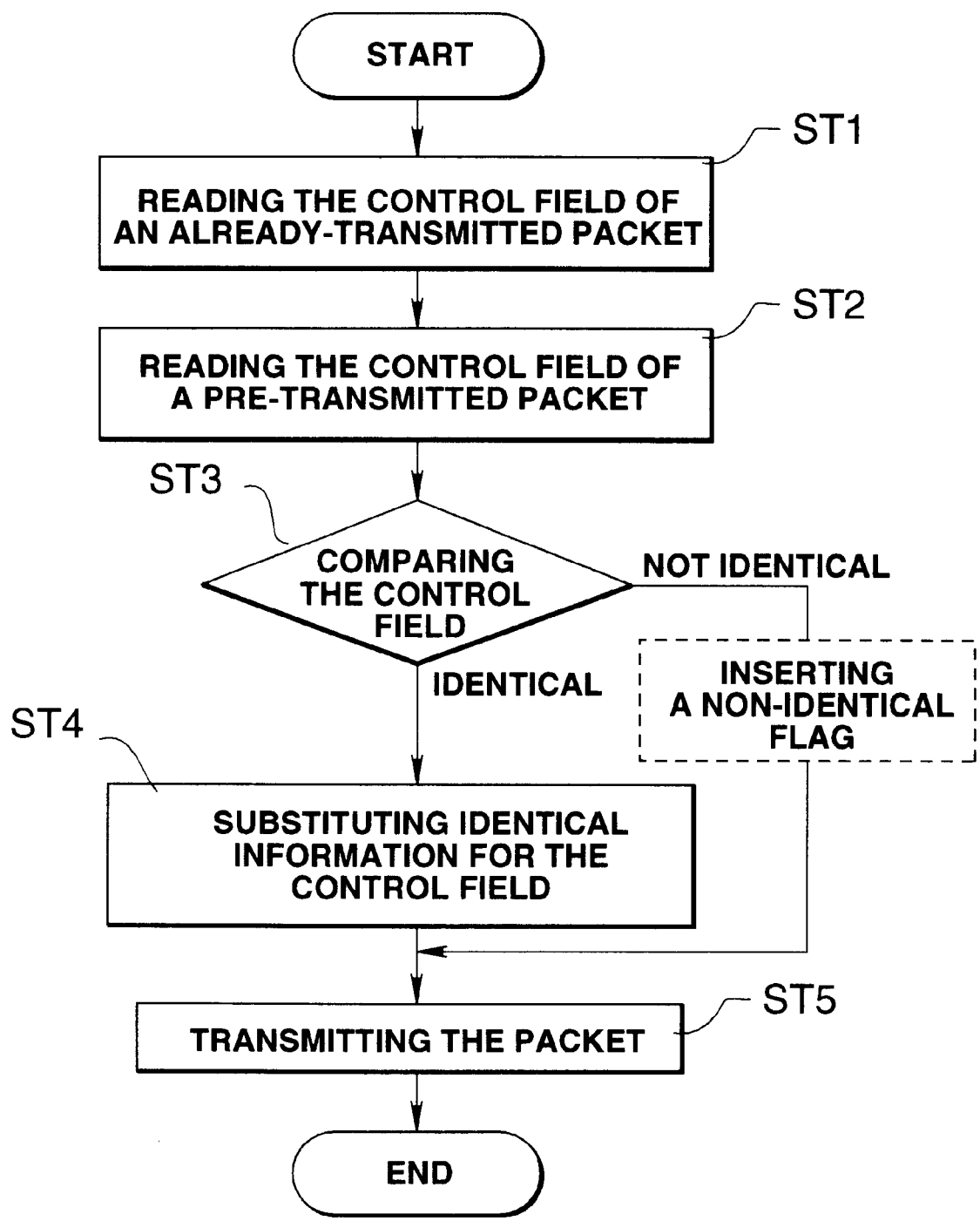
FIG. 5 shows a flowchart of a transmitting processing of the first embodiment of the present invention.
Figure 6:
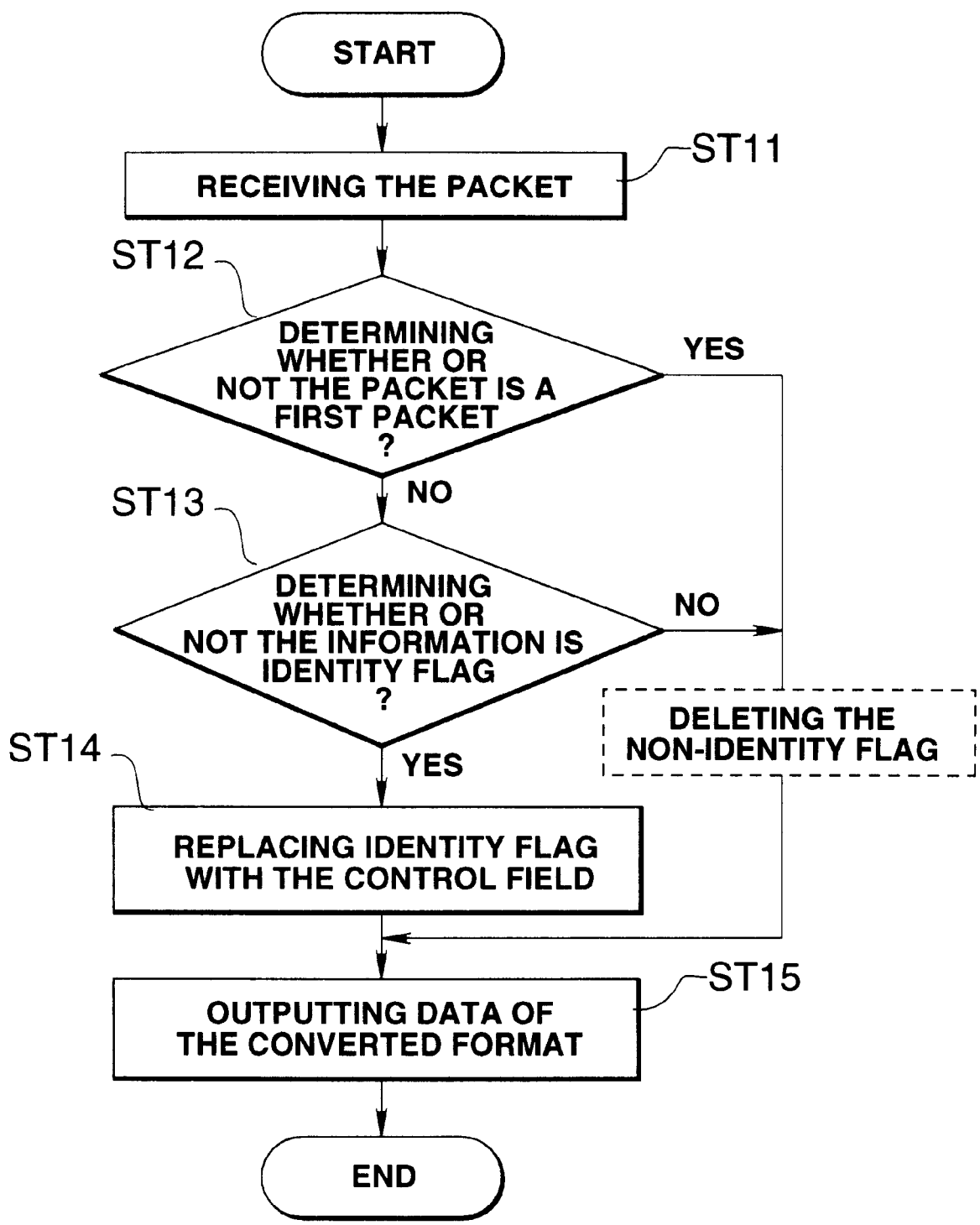
FIG. 6 shows the flow chart of a receiving processing of the first embodiment of the present invention.

The transmitting processing and the receiving processing are explained below by referring to the flowcharts in FIGS. 5 and 6.

Firstly, the transmitting processing is hereinafter explained according to FIG. 5.

ST1: Reading the control field of an already-transmitted packet. This processing corresponds to reading the content of the control field memory 12 as shown in FIG. 3.

ST2: Reading the control field of a pre-transmission packet. This processing corresponds to cutting out a control field by means of the control field cutting-out circuit 11 as shown in FIG. 3.

ST3: Comparing the control field obtained at ST1 with the control field obtained at ST2. This processing corresponds to the processing of the control field comparing circuit 13 as shown in FIG. 3. If the control field is found to be identical as a result of the comparison, the processing proceeds to ST4 so that an identity flag will be substituted for the control field. If the control field is found to be not identical as a result of the comparison, the processing proceeds to ST5 because there is no need to substitute the control field.

A step of inserting a non-identical flag may be provided between ST3 and ST5. In this case, the processing from ST3 to ST5 correspond to the processing of the flag generating circuit 14 through the control field substituting circuit 16 as shown in FIG. 3.

It is obvious from the explanation above that, if not identical, the control field may be made to a combination of (non-identity flag)+(control field) as shown in FIG. 8A, which corresponds to the construction shown in FIG. 3. If not identical, it is also possible to transmit the original data shown in FIG. 8B (which corresponds to the flowchart in FIG. 5) without making any change.

ST4: Substituting identity flag for the control field. This processing corresponds to the processing of the new control field generating circuit 15 and the control field substituting circuit 16. In this case, the original data in FIG. 8B is converted into a format as shown in FIG. 8C.

ST5: Transmitting the packet.

The receiving processing is hereinafter explained according to FIG. 6.

ST11: Receiving the packet.

ST12: Determining whether or not the packet is a first packet. If it is the first packet (YES), the processing proceeds to step ST15 because the control field has been transmitted for certain. If it is not the first packet (NO), the processing proceeds to step ST13 in order to determine whether or not the information of the packet is identical to the identity flag of the previous packet.

ST13: Determining whether or not the information is identity flag. That is, determining whether or not the information has a format of FIG. 8C. This processing corresponds to the processing of the identity and control field cutting-out circuit 21 and the identity flag determining circuit 22 as shown in FIG. 4. If the information is identity flag (YES), the processing proceeds to step ST14. If not identical (NO), the processing proceeds to step ST15 and outputs the information without making any change.

A step of deleting the non-identity flag may be provided between steps ST13 and ST15. In this case, processing of the steps ST13 through ST15 corresponds to the processing of the control field selecting circuit 24 and the control field replacing circuit 25 as shown in FIG. 4.

As can be observed in the explanation above, if not identical, the frame has a control field which is a combination of (non-identity flag)+(control field) as shown in FIG. 8A, which may be reverted to the original data as shown in FIG. 8B. This corresponds to the processing at the receiving station as shown in FIG. 4.

ST14: Replacing identity flag with the control field. This is a processing to convert the format of FIG. 8C into the format of FIG. 8B.

ST15: Outputting data of the converted format.

An example of a cache identity flag (without a designation of a cache renewal number) is shown in FIG. 7. At least 1 bit is required for such flag. If the cache has only one entry (in the case of comparison only with the previous transmission), 1-bit identical/non-identity flag will be obtained.

If there is a cache with plurality entries, the frame format will have a variable length construction of the 1-bit identity/non-identity flag plus a flag indicating the entry number, which is added only if identical, thereby reducing the overhead on non-identical occasions. In this case, the above-mentioned cache renewing algorithm without renewal number designation is used. Cache identical flag shown in FIG. 7 can be applied to the second embodiment of the present invention described below.

As explained above, according to the first embodiment of the present invention, it is possible to conduct efficient data compression by omitting any identical data in the address portion of the Ethernet control field when only a packet from or to specific terminals is transmitted in the point-to-point packet communication.

Second Embodiment of the Present Invention

An example of a transmitting station and a receiving station with a plurality of entry caches for two different fields is explained below.

Figure 9:
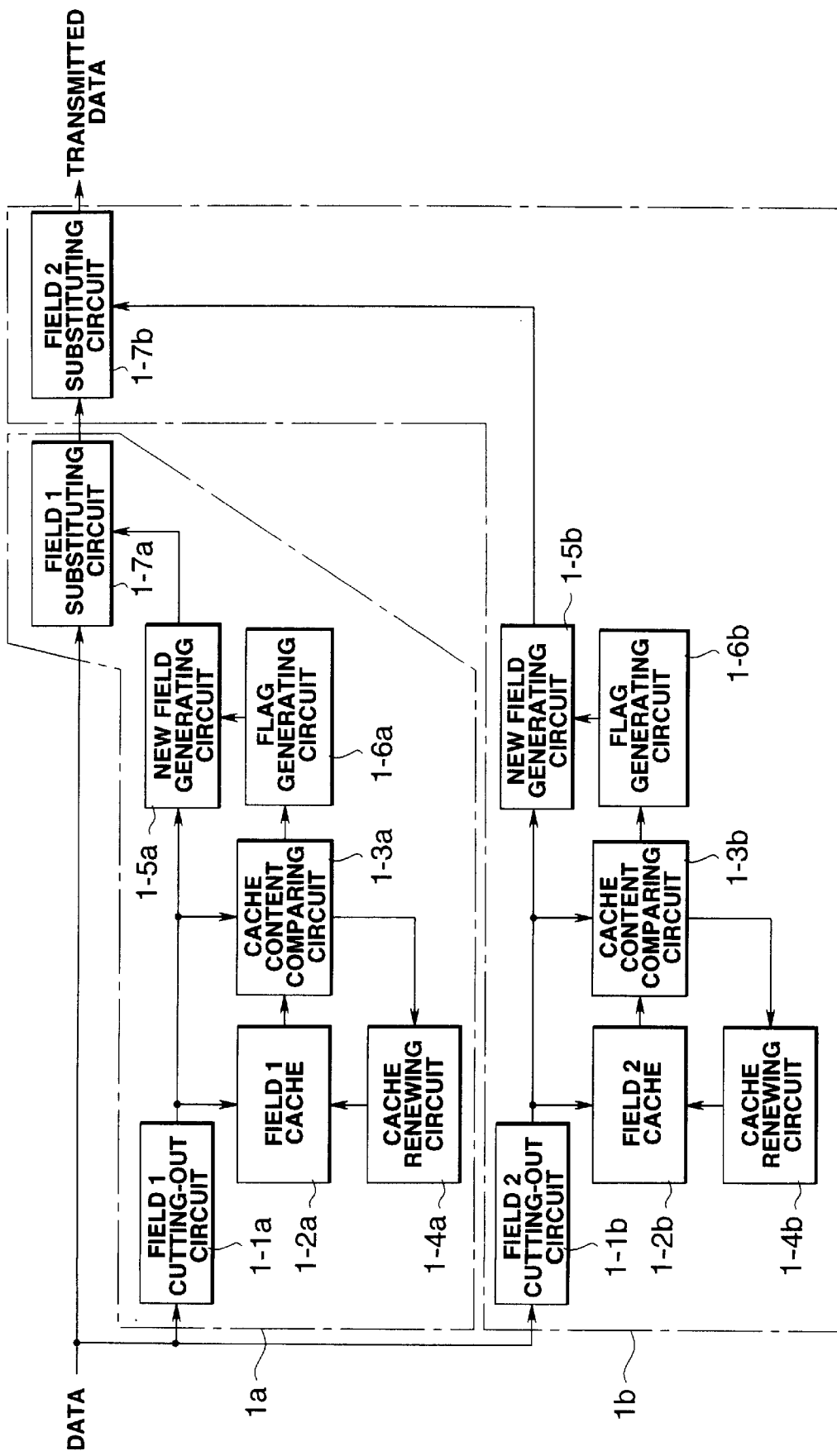
FIG. 9 shows a construction of the transmitting station side of the second embodiment of the present invention.
Figure 10:
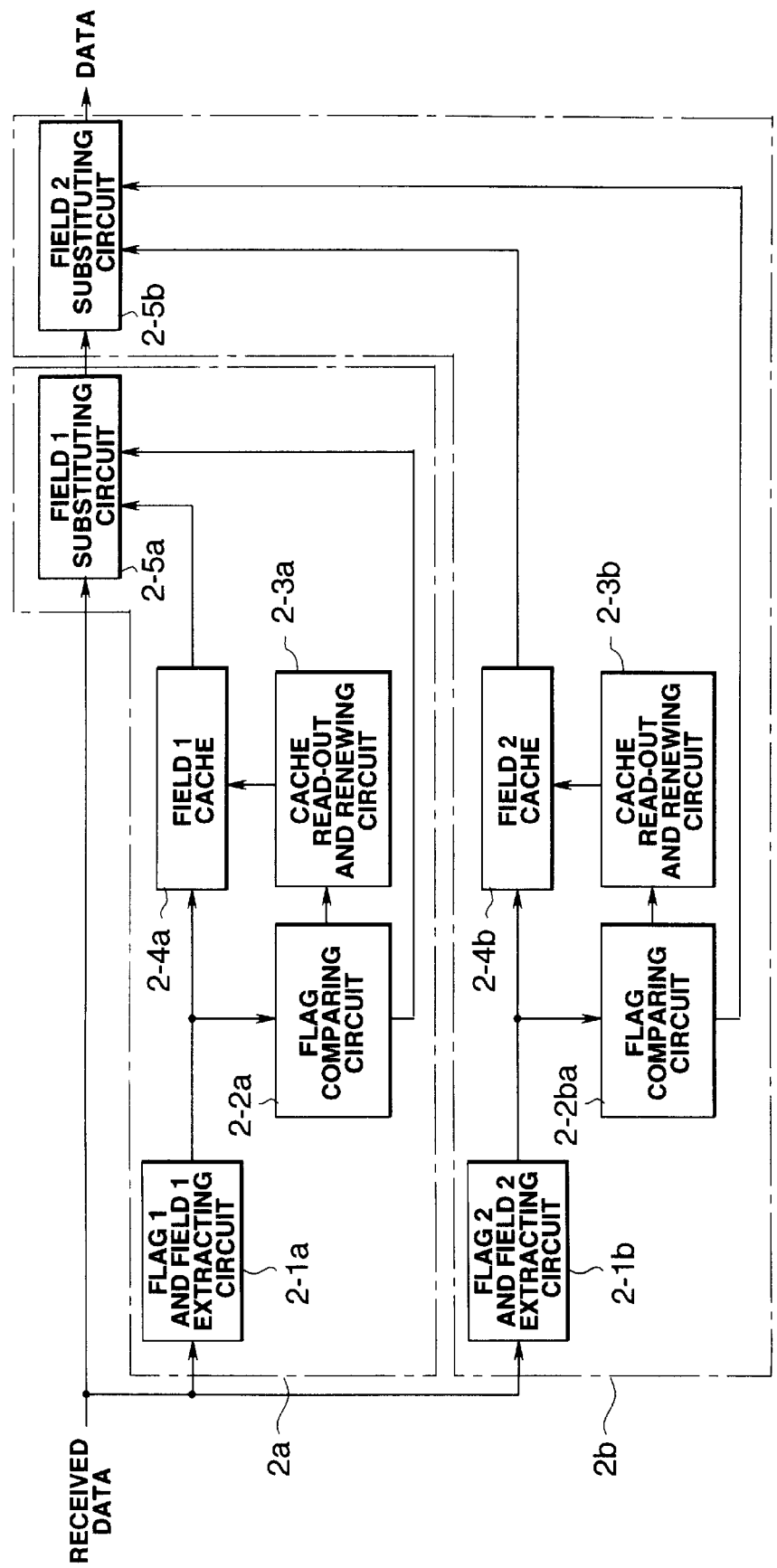
FIG. 10 shows a construction of the receiving station side of the second embodiment of the present invention.

FIG. 9 is a block diagram of the transmitting station side, and FIG. 10 is a block diagram of the receiving station side. The transmitting station in FIG. 9 and the receiving station in FIG. 10 constitutes a pair. By using a plurality of entry caches for two different fields, data compression can be conducted even more efficiently than as in the first embodiment.

In FIG. 9, reference numeral 1a indicates a first transmission processing portion for processing a field 1 and reference numeral 1b indicates a second transmission processing portion for a processing field 2. The first transmission processing portion 1a comprises a field 1 cutting-out circuit 1-1a, a field 1 cache 1-2a, a cache content comparing circuit 1-3a, a cache renewing circuit 1-4a, a new field generating circuit 1-5a, a flag generating circuit 1-6a, and a field 1 substituting circuit 1-7a. The second transmission processing portion 1b comprises a field 1 cutting-out circuit 1-1b, a field 1 cache 1-2b, a cache content comparing circuit 1-3b, a cache renewing circuit 1-4b, a new field generating circuit 1-5b, a flag generating circuit 1-6b, and a field substituting circuit 1-7b.

A field cutting-out circuit 1-1 cuts out a specific field from data. This circuit cuts out a specific field of data with a determined frame format (either a fixed length or a variable length). The position and the length of this field is determined depending on the frame format.

A field cache 1-2 stores the content of the field in the previous frame. The larger the number of cache entries, the higher will be the identity rate. However, the overhead of the identity flag will be larger.

A cache content comparing circuit 1-3 compares the cut-out field with the content of the cache and controls the movement thereafter. This portion is unnecessary when the cache is composed of CAM (content addressable memory). Each entry is examined so as to find whether or not it is identical, and the information of identity/non-identity is outputted together with the cache entry number when identical.

A cache renewing circuit 1-4 renews the content of the cache when the cache is not identical. When the cache is not identical, the value of the current field is written into the cache 1-2. When there is a plurality of entries, an ordinary cache rewriting algorithm can also be used.

A flag generating circuit 1-6 generates an identity flag on the basis of the result obtained at the comparing circuit. An identical flag is outputted according to the number of the identical cache entry. When not identical, a non-identity flag is outputted.

A new field generating circuit 1-5 generates a new field. When the cache is identical, only the identity flag will be outputted, and when the cache is non-identical, a combination of the non-identity flag and the original flag is outputted. Examples of formats outputted from a field substituting circuit 1-7b are shown in FIGS. 14A and 14C. FIG. 14A shows the case where the two fields are both not identical, and FIG. 14C shows the case where the two fields are both identical. FIG. 14B shows the original data.

The field substituting circuit 1-7 substitutes a new field for a specific field (the portion to be cut out at the cutting-out circuit) of data. This circuit substitutes a new field for the cut-out field portion. The frame is generally extended only by the length of the flag when not identical, while the frame is shortened when identical.

In FIG. 10, reference numeral 2a indicates the first receiving processing portion where the field 1 is processed, and reference numeral 2b indicates the second receiving processing portion where the field 2 is processed. The first receiving processing portion 2a comprises a flag 1 and field 1 extracting circuit 2-1a, a flag comparing circuit 2-2a, a cache read-out and renewing circuit 2-3a, a field 1 cache 2-4a and a field 1 substituting circuit 2-5a. The second receiving processing portion 2b comprises a flag 2 and field 2 extracting circuit 2-1b, a flag comparing circuit 2-2b, a cache read-out and renewing circuit 2-3b, a field 2 cache 2-4b and a field substituting circuit 2-5b.

The flag and field extracting circuit 2-1 extracts a specific flag and field from data. The flag portion and the field portion inserted at the transmitting station side are extracted from the received data sequence.

The flag comparing circuit 2-2 determines the content of a variable-length flag. This circuit determines whether the flag indicates non-identity (in the case that there is no identical entry within the cache at the transmitting side) or the cache entry number when identical.

The cache read-out and renewing circuit 2-2 reads or renews the field cache. On the basis of the result obtained at the flag comparing circuit 2-2, a designated entry is read when identical, and a renewal (rewriting) of the cache is conducted when not identical. The cache must be renewed in the same procedure as at the transmitting side.

The field cache 2-4 memorizes the content of the control field which has been previously transmitted. The procedure of renewing the content of the cache will be described below.

The field substituting circuit 2-5 substitutes a new field for a certain field of data. The field which is read from the cache (when not identical) or the field which is transmitted (when not identical) is substituted for the flag and field portion (only the flag, when identical).

The transmission processing and the receiving processing are hereinafter explained according to the flowcharts in FIGS. 11 and 12.

Figure 11:
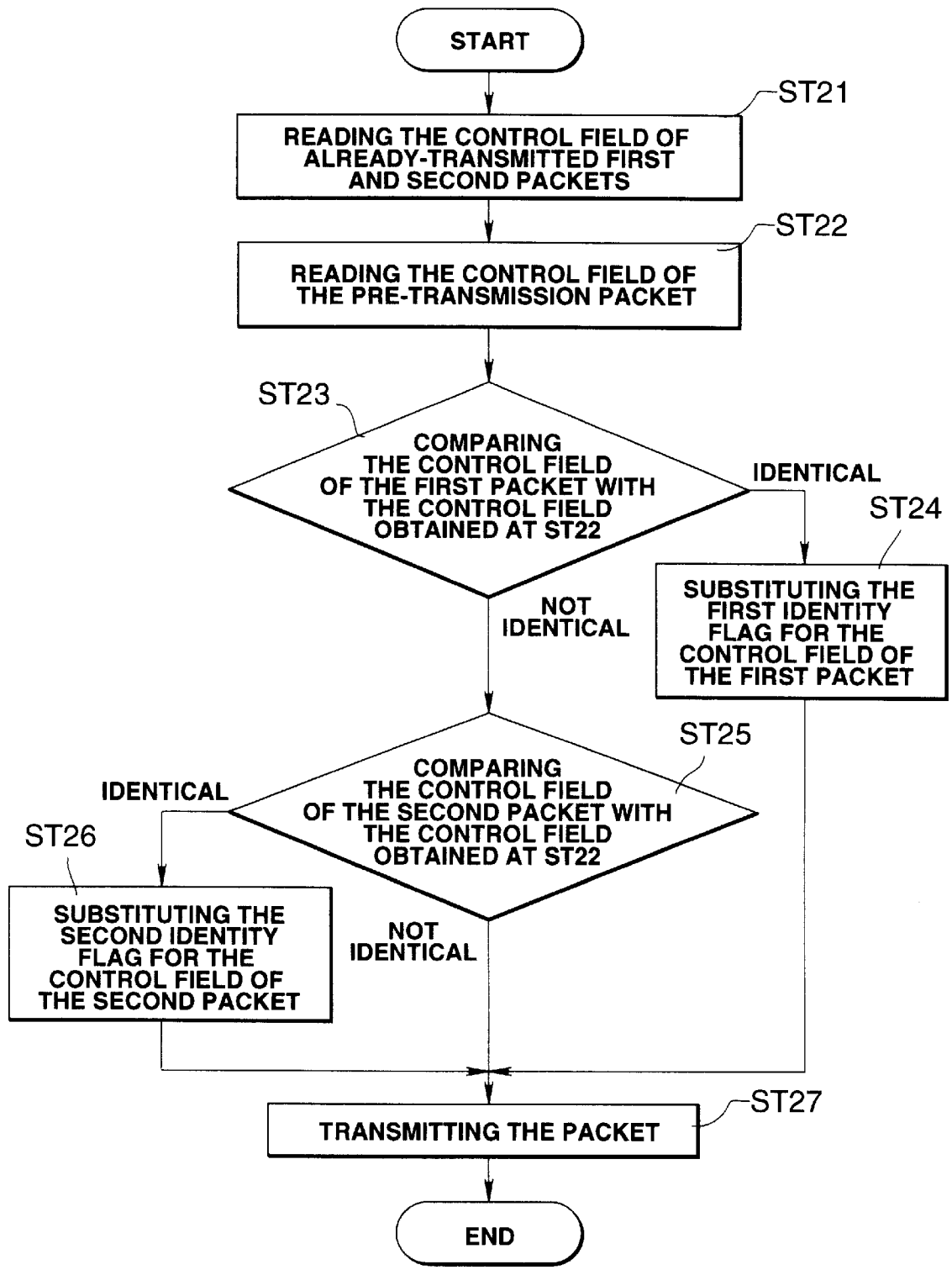
FIG. 11 shows a flowchart of a transmitting processing of the second embodiment of the present invention.
Figure 12:
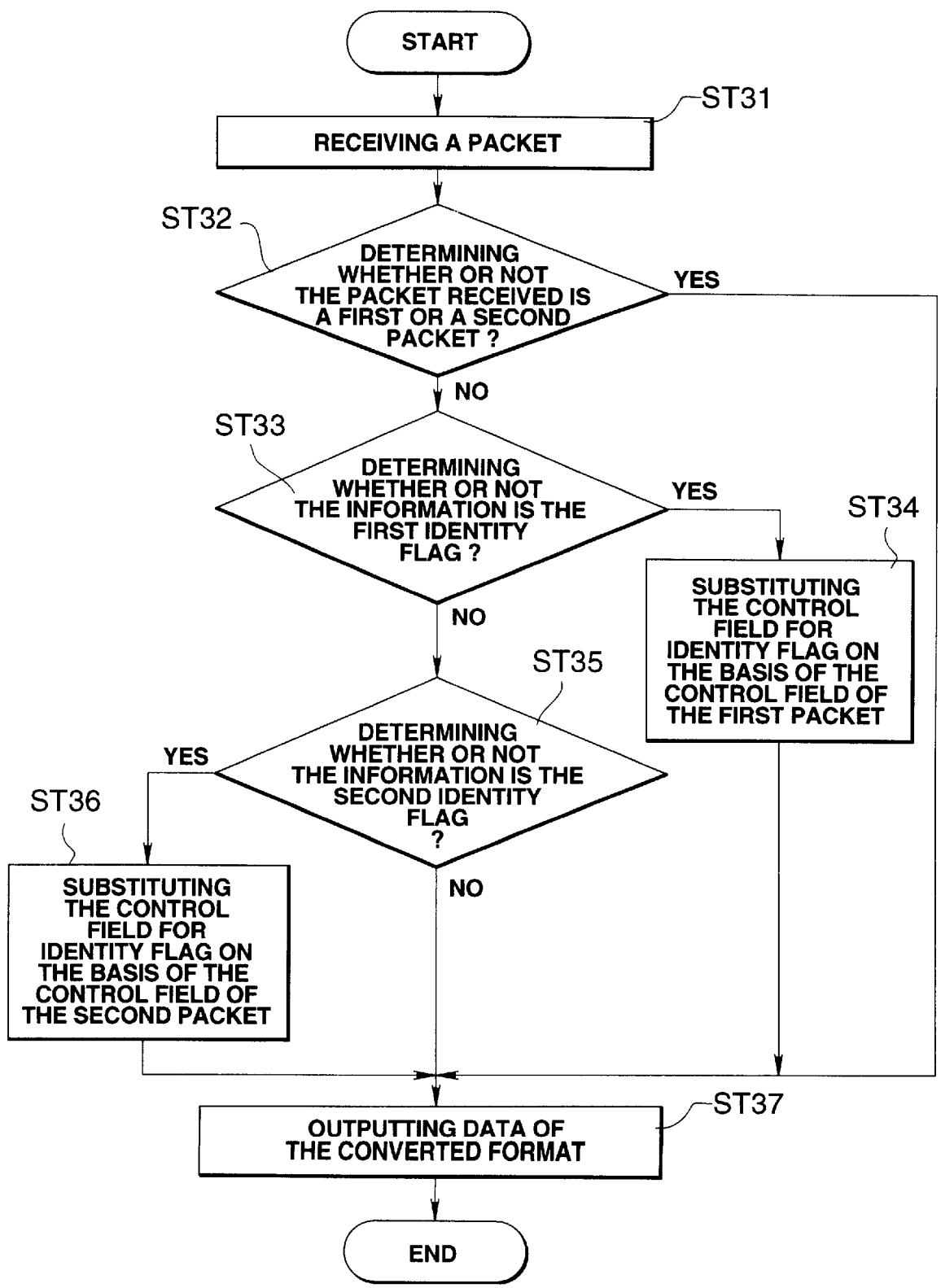
FIG. 12 shows a flowchart of a receiving processing of the second embodiment of the present invention.

Firstly, the transmission processing is explained according to FIG. 11.

ST21: Reading the control field of already-transmitted first and second packets.

ST22: Reading the control field of the pre-transmission packet. This processing corresponds to cutting out the control field by means of the control field cutting-out circuits 1-1a and 1-1b as shown in FIG. 9.

ST23: Comparing the control field of the first packet obtained at ST21 with the control field obtained at ST22. This processing corresponds to the processing of the cache content comparing circuit 1-3a as shown in FIG. 9. If identity is obtained as a result of the comparison, the processing proceeds to step ST24 to substitute an identical flag for the control field. If non-identity is obtained as a result of the comparison, the processing proceeds to step ST24 because there is no need to substitute the control field of the first packet.

A step of inserting a non-identity flag may be provided between steps ST23 and ST25. In other words, in the case of non-identity, the control field may be made to a combination of (non-identity flag)+(control field) as shown in FIG. 14A, which corresponds to the construction of FIG. 9. Otherwise, in the case of non-identity, the original data may be transmitted without any change as shown in FIG. 14B, which corresponds to the flowchart in FIG. 11.

ST24: Substituting the first identity flag for the control field of the first packet. This processing corresponds to the processing of the new control field generating circuit 1-5a and the control field substituting circuit 1-7a. In this case, the original data shown in FIG. 14B is converted into the format shown in FIG. 14C.

ST25: Comparing the control field obtained at ST21 with the control field obtained at ST22. This processing corresponds to the processing of the cache content comparing circuit 1-3b. When identity is obtained as a result of the comparison, the processing proceeds to step ST26 to substitute the identity flag for the control field. When non-identity is obtained as a result of the comparison, the processing proceeds to step ST27 because there is no need to substitute the control field of the second packet.

As mentioned above, a step of inserting the non-identity flag may be provided between steps ST25 and ST27.

ST26: Substituting the second identity flag for a control field of the second packet. This processing corresponds to the processing of the new control field generating circuit 1-5b and the control field substituting circuit 1-7b. In this case, the original data as shown in FIG. 14B is converted to the format shown in FIG. 14C.

ST27: Transmitting the packet.

Receiving processing is explained below according to FIG. 12.

ST31: Receiving a packet.

ST32: Determining whether or not the packet received is a first or a second packet. If it is identical (YES), the control field has been surely transmitted, and, therefore, the processing proceeds to step ST37. If it is not (NO), the processing proceeds to step ST33 to determine if the packet is the first or second identity flag.

ST33: Determining whether or not the information is the first identity flag. That is, determination is made as to whether or not the received packet is in the format shown in FIG. 14C, and whether or not the identity flag indicates the first identity flag. This processing corresponds to the processing at the identity, flag and field extracting circuit 2-1 and the flag comparing circuit 2-2 as shown in FIG. 10. If the information is found to be identical (YES), the processing proceeds to step ST34. If the information is found to be not identical (NO), the processing proceeds to step ST35.

Furthermore, a step of eliminating a non-identity flag may be provided between steps ST33 and ST35. In this case, the processing at steps ST33 through ST35 corresponds to the processing of the field cache 2-4 and the field substituting circuit 2-5 shown in FIG. 10.

As can be observed in the explanation above, in the case of non-identity, the control field may be made into a combination of (non-identity flag)+(control field), and be then reverted to the original data as shown in FIG. 14B. This corresponds to the processing at the receiving station shown in FIG. 10.

ST34: Substituting the control field for identity flag on the basis of the control field of the first packet. This is the processing to convert the format shown in FIG. 14C to the format shown in FIG. 14B.

ST35: Determining whether or not the information is the second identity flag. That is, determination is made as to whether or not the frame is in the format as shown in FIG. 14C, and whether or not the identity flag indicates the second identity flag. This processing corresponds to the processing of the identity, flag and field extracting circuit 2-1 and the flag comparing circuit 2-2 shown in FIG. 10. If the information is identical (YES), the processing proceeds to step ST34. If the information is not identical (NO), the processing proceeds to step ST35.

Furthermore, a step of eliminating the non-identity flag may be provided between the steps ST33 and ST35.

ST36: Substituting the control field for the identity flag based on the control field of the second packet. This is a processing to convert the format shown in FIG. 14C to the format shown in FIG. 14B.

ST37: Outputting data of the converted format.

An example of the cache alteration procedure is explained below.

The first example is a cache renewing procedure when the flag portion is made to have a variable length, thereby minimizing the overhead. In this case, the cache renewal number is not designated by the transmitting side.

The second example is a cache renewing procedure when the flag portion is made to have a fixed length, thereby laying emphasis on the cache hit rate. In this case, the cache renewal number is designated by the transmitting side.

(1) Without Renewal Number Designation

If a control field which is not memorized in the field cache 1-2 appears at the transmitting side, the contents of the memorized cache entries are moved behind by one cache each, and a new control field is entered into the very front entry of the field cache 1-2. For example, assuming that a control field comprising a plurality of caches A, B, C and D are provided, in which d1, d2, d3 and d4 are respectively memorized, and that d1 is the latest data and d4 is the oldest data, then a new data d0 comes, d1, d2 and d3 are moved to caches B, C and D, and data d0 is memorized in the cache A which has become empty.

When a non-identity flag is received at the receiving side, the contents of the caches which are memorized in the field cache 2-4 are moved behind by one cache each, and a new control field is entered into the very front entry of the cache.

(2) With Renewal Number Designation

If a control field which is not memorized in the field cache 1-2 appears at the receiving side, an entry to be renewed in accordance with the publicly known cache renewal algorithm will be chosen. For example, least-frequently-used entry, the oldest entry, most-previously-accessed entry, entry of low priority, or entry with less important address memorized therein are chosen. The number of such entry is sent with the control field.

At the receiving side, the content of the cache is renewed by entering the new control field in the entry with the entry number which has been sent.

An example of an identity flag in the case of a 3-entry-cache is shown in FIG. 13. This is an example of a cache entry flag which has a plurality of entry caches and a renewal number designation.

An exemplary flag shown in FIG. 13 comprises an identity or non-identity flag and an entry number, whether the cache is identical or non-identical. Therefore, if there are a plurality of cache entries with renewal number designation, 1-bit identical/non-identity flag and a fixed-length flag which indicates the entry number will be required. The entry number included in the flag indicates the entry number of an identity flag when identical, while it indicates the entry number to be renewed when not identical.

As seen above, according to the second embodiment of the present invention, when only the packet in the point-to-point packet communication from or to a certain terminal is transmitted, the identical data portions in, for example, the as the address portions of the control field of Ethernet are omitted, thereby allowing efficient data compression.

In addition, the second embodiment realizes a higher hit rate because of a plurality of cache entries, and further enhances data compression efficiency.

Moreover, it is possible to make the flag portion have a variable length and to minimize the overhead by conducting the cache renewal without number designation.

Furthermore, it is possible to make flag portion have a fixed length and to enhance the cache hit rate.

Although the first embodiment and second Embodiment have been so far explained by referring to the example of the point-to-point communication, the first and second embodiment can also be applied to a multi-point communication.

When the above embodiments are applied to the multi-point communication, attentions must be paid to the following points. Upon a multi-point transmission, many kinds of data are transmitted in terms of physical layer address. Therefore, a higher efficiency will not be obtained even if a cache with a few entry is prepared for the physical layer address. Therefore, the embodiments can be efficiently applied to the multi-point communication by conducting the following measures:

(1) applying the effective cache renewing algorithm by increasing the number of cache entries;

(2) applying the above-mentioned compression to the higher layer address field portion, because there is a possibility there may be not many kinds of such address fields; and (3) selecting a field to be compressed, other than the address, especially in the case of a fixed length data format;

As described above, according to this invention, the control field of the pre-transmission packet signal is compared with the control field of the already-transmitted packet signal upon packet signal transmission. On the basis of such comparison result, identity flag is substituted for at least a part of the control field of the pre-transmission packet signal, and is then transmitted. Accordingly, when only the packet from or to a certain terminal is transmitted, data with the same content in the portions, such as address of the control field of the packet signal can be omitted, thereby allowing efficient data compression.

According to the present invention, non-identity flag is inserted to the control field of the pre-transmission packet signal on the basis of the result of the comparison. Therefore, transmission can be conducted for certain together with identity flag.

According to the present invention, because a plurality of caches which store a plurality of control fields are provided, a plurality of cache entries are provided and, therefore, a higher hit rate and high efficiency of data compression can be attained. Moreover, upon input of a new control field, the content stored in the plurality of caches are moved from one cache to the next one after another, and a cache renewing circuit which stores the new control field is provided in the very front entry of said plurality of caches. Therefore, it is possible to make the flag portion have a variable length and to minimize the overhead by conducting the cache renewal without a number designation.

Furthermore, according to the present invention, since a plurality of caches which store a plurality of control fields are provided, there are a plurality of cache entries and, therefore, a higher hit rate and even higher data compression efficiency can be attained. Moreover, when a new control field is inputted, a cache to be renewed is specified among the plurality of caches, and such cache is provided with the cache renewing circuit which stores the new control field. Therefore, it is possible to make the flag portion have a fixed length and to improve the cache hit rate by conducting the cache renewal with number designation.

The entire disclosure of Japanese Patent Application No. HEI 8-325261 filed on Dec. 5, 1996 including specification, claims, drawings and summary are incorporated herein by reference in its entirety.

What is claimed is:

1. A transmitting device comprising:
   a first storing circuit which stores a control field of a post-transmission packet signal;
   a comparing circuit which compares the control field of a pre-transmission packet signal with the control field stored in said first storing circuit; and
   a control field substituting circuit which transmits a packet signal by substituting identical information for at least a part of the control field of said pre-transmission packet signal on the basis of the result of comparison by said comparing circuit,
   wherein said first storing circuit includes a plurality of cache memories which store a plurality of control fields, and further comprises a cache memory renewing circuit which, upon input of a new control field, moves the contents stored in said plurality of cache memories from one cache to the next one after another, and stores said new control field in the very front entry of said plurality of cache memories.

2. A transmitting device comprising:
   a first storing circuit which stores a control field of a post-transmission packet signal;
   a comparing circuit which compares the control field of a pre-transmission packet signal with the control field stored in said first storing circuit; and
   a control field substituting circuit which transmits a packet signal by substituting identical information for at least a part of the control field of said pre-transmission packet signal on the basis of the result of comparison by said comparing circuit,
   wherein said first storing circuit includes a plurality of cache memories which store a plurality of control fields, and further comprises a cache memory renewing circuit which, upon input of a new control field, specifies a cache memory to be renewed among said plurality of cache memories and stores said new control field in the cache memory.

3. A transmitting device according to claim 2, wherein said cache memory renewing circuit specifies, among said plurality of cache memories, at least one of less-frequently-used cache memory, previously-received cache memory, the earliest cache memory, cache memory of low priority, and less important cache memory.

4. A transmitting device according to claim 2, wherein said first storing circuit includes cache memories, the number of which corresponds to the number of physical layer address, when said transmitting device is used for multi-point transmission.

5. A receiving device comprising:
   a storing circuit which stores a control field of an already-received packet signal;
   an identical information determining circuit which determines whether or not there exists identical control field information within a newly received packet signal relative to information in such already-received packet signal based on a comparison between said already-received and newly received packet signals; and
   a control field resubstituting circuit which substitutes control field information stored in said storing circuit for identical control field information within said newly received packet signal when said identical information determining circuit determines that identical information exists.

6. A receiving device according to claim 5, wherein said control field resubstituting circuit deletes non-identical information of said newly received packet signal on the basis of the result of determination by said identical information determining circuit.

7. A receiving device according to claim 5, wherein said storing circuit includes a plurality of cache memories which store a plurality of control fields, and further comprises a cache memory renewing circuit which, upon input of a new control field, moves the contents stored in said plurality of cache memories from one cache to the next, one after another, and stores said new control field in the very front entry of said plurality of cache memories.

8. A receiving device according to claim 5, wherein said storing circuit includes a plurality of cache memories which store a plurality of control fields, and further comprises a cache memory renewing circuit which stores, upon input of a new control field, said new control field on the basis of cache memory specifying information which is transmitted from the transmitting side.

9. A packet transmission system, wherein a packet signal is transmitted by the transmitting device described in claim 1, and wherein a packet signal is received by a receiving device.

10. A packet signal transmission method, comprising:
    a first read-out step of reading a control field of a post-transmission first packet signal;
    a second read-out step of reading a control field of a pre-transmission second packet signal;
    a comparison step of comparing the control field of said first packet signal with the control field of said second packet signal;
    a substitution step of substituting identical information for the control field of said second packet signal when at least a prescribed degree of identity is determined at said comparison step;
    a transmission step of transmitting said second packet;
    a reception step of receiving said second packet;
    a determination step of determining whether or not the control field of said second packet is identical information; and
    a resubstitution step of resubstituting said identical information on the basis of the control field of an already-received first packet signal when the control field of said second packet is identical information.

11. A packet signal transmission method according to claim 10, further comprising:
    an insertion step of inserting non-identical information to the control field in said second packet signal when non-identity is determined at said comparison step; and
    a deletion step of deleting said non-identical information when it is determined that the control field is not identical information at said determination step.

12. A packet signal transmitting method according to claim 10, wherein said first read-out step, said second read-out step, said comparison step, said substitution step, said determination step and said resubstitution step are applied to the address field of higher layer when said method is used for multi-point communication.

13. A packet signal transmitting method according to claim 10, wherein said first read-out step, said second read-out step, said comparison step, said substitution step, said determination step and said resubstitution step are applied to fields other than address fields when the method is used for multi-point communication.

14. A packet signal transmitting method, comprising:
- a first read-out step of reading the control fields of post-transmission first packet signal and second packet signal;
- a second read-out step of reading a control field of a pre-transmission third packet signal;
- a first comparison step of comparing the control field of said first packet signal with the control field of said third packet signal;
- a first substitution step of substituting first identical information for the control field of said third packet signal if at least a prescribed degree of identity is determined at said first comparison step;
- a second comparison step of comparing the control field of said second packet signal with the control field of said third packet signal;
- a second substitution step of substituting second identical information for the control field of said third packet signal if at least partial identity is determined at said second comparison step;
- a transmission step of transmitting said third packet;
- a reception step of receiving said third packet;
- a first determination step of determining whether or not the control field of said third packet is the first identical information;
- a first resubstitution step of resubstituting said first identical information on the basis of the control field of an already-received first packet signal when the control field of said third packet is the first identical information;
- a second determination step of determining whether or not the control field of said third packet is the second identical information; and
- a second resubstitution step of resubstituting said second identical information on the basis of the control field of an already-received second packet signal when the control field of said third packet is the second identical information.

15. A packet signal transmission method according to claim 14, further comprising:
- an insertion step of inserting non-identical information to the control field in said third packet signal if non-identity is determined at least either at said first comparison step or at said second comparison step; and
- a deletion step of deleting said non-identical information when it is determined at least either at said first determination step or at second determination step that the control field is not identical information.

16. A packet signal transmission method according to claim 14, wherein said first read-out step, said second read-out step, said first comparison step, said second comparison step, said first substitution step, said second substitution step, said first determination step, said second determination step, said first resubstitution step and said second resubstitution step are applied to an address field of higher layer when said method is used for multi-point communication.

17. A packet signal transmission method according to claim 14, wherein said first read-out step, said second read-out step, said first comparison step, said second comparison step, said first substitution step, said second substitution step, said first determination step, said second determination step, said first resubstitution step and said second resubstitution step are applied to fields other than address fields when said method is used for multi-point communication.

* * * * *